US008474151B2

(12) United States Patent
Fischer (10) Patent No.: US 8,474,151 B2
(45) Date of Patent: Jul. 2, 2013

(54) METHOD AND DEVICE FOR MEASURING THE THICKNESS OF THIN LAYERS OVER LARGE-AREA SURFACES TO BE MEASURED

(75) Inventor: Helmut Fischer, Oberaegeri (CH)

(73) Assignee: Helmut Fischer GmbH Institut fuer Elektronik und Messtechnik, Sindelfingen (DE)

( * ) Notice: Subject to any disclaimer, the term of this patent is extended or adjusted under 35 U.S.C. 154(b) by 222 days.

(21) Appl. No.: 13/068,407

(22) Filed: May 10, 2011

(65) Prior Publication Data

US 2011/0271750 A1 Nov. 10, 2011

(30) Foreign Application Priority Data

May 10, 2010 (DE) .......................... 10 2010 020 116

(51) Int. Cl.
*G01B 7/06* (2006.01)
(52) U.S. Cl.
USPC ................ 33/834; 33/1 BB; 33/124; 73/37.8; 73/865.8
(58) Field of Classification Search
USPC ................. 33/832, 1 BB, 121, 122, 123, 124, 33/833, 834; 73/37.8, 865.8
See application file for complete search history.

(56) References Cited

U.S. PATENT DOCUMENTS

| 2,802,272 | A | * | 8/1957 | Martin et al. | .................... 33/123 |
| 2,947,083 | A | * | 8/1960 | Rahn | ................................ 33/1 R |
| 4,450,628 | A | * | 5/1984 | Rocks | ............................. 33/833 |
| 4,616,419 | A | * | 10/1986 | Kubo | ................................ 33/122 |
| 4,881,415 | A | * | 11/1989 | Hergeth | ....................... 73/865.8 |
| 5,012,588 | A | * | 5/1991 | Face, III | ........................... 33/533 |
| 5,394,085 | A | * | 2/1995 | Nix et al. | ...................... 324/231 |
| 5,575,075 | A | * | 11/1996 | Sasaki | ......................... 33/501.02 |
| 6,538,434 | B1 | * | 3/2003 | Steingroever et al. | ........ 324/230 |
| 6,777,930 | B2 | * | 8/2004 | Fischer | ......................... 324/230 |
| 6,907,799 | B2 | * | 6/2005 | Jacobsen et al. | ............. 73/865.8 |
| 7,472,491 | B2 | * | 1/2009 | Fischer | ............................ 33/561 |

FOREIGN PATENT DOCUMENTS

DE 10 2005 054 593 A1 5/2007

* cited by examiner

*Primary Examiner* — Christopher Fulton
(74) *Attorney, Agent, or Firm* — Kriegsman & Kriegsman (57) ABSTRACT

The invention relates to a method and a device for measuring the thickness of thin layers over large-area surfaces to be measured (12), in which at least one measuring probe (28), which comprises at least one sensor element (29) and at least one contact spherical cap (31) associated with the sensor element (29), is applied to the surface to be measured (12) in order to obtain a measured value, wherein the large-area surface to be measured (12) is subdivided into individual partial areas (14), a matrix of measurement points (16) is determined for each partial area (14) to be inspected, measured values are ascertained at equidistant measurement points (16) along at least one row (17) of the matrix of the partial area (14) using a device (21) carrying the at least one measuring probe (28), and the measured values are ascertained successively for all rows (17) in the matrix in the partial area (14) and evaluated for this partial area (14).

16 Claims, 5 Drawing Sheets

METHOD AND DEVICE FOR MEASURING THE THICKNESS OF THIN LAYERS OVER LARGE-AREA SURFACES TO BE MEASURED

The invention relates to a method and a device for measuring the thickness of thin layers over large-area surfaces to be measured, such as the hulls of ships.

The measurement of the thickness of thin layers using a measuring probe which comprises at least one sensor element and at least one contact spherical cap assigned to the sensor element is known for example from DE 10 2005 054 593 A1. As a result of such a measuring probe measurements can be taken in accordance with the magnetic induction method or in accordance with the eddy current method depending on the base material and the coating. For example, such measuring probes are applied manually to a surface to be measured so as to measure the layer thickness. Such a method is not adapted, for example, for the measurement and inspection of large-area coatings and surfaces to be measured, such as the hull of a ship or the wing of an aircraft.

The problem addressed by the invention is to propose a method and a device for measuring the thickness of thin layers, whereby the surface to be measured and inspected is measured comprehensively in a simple manner.

This object is achieved by a method according to the features of claim 1 and a device according to the features of claim 6. Further advantageous embodiments are disclosed in the respective dependent claims.

In the method according to the invention the large-area surface to be measured is subdivided into individual partial areas, a matrix of measurement points is determined for each partial area and measured values are obtained at equidistant measurement points along at least one row of the matrix using at least one device carrying the measuring probe, and the measured values are obtained successively for all rows in the matrix in a partial area and evaluated for this partial area. By obtaining equidistant measured values along a plurality of rows it is possible, in a simple manner, to form a grid or matrix of measurement points for an individual partial area, whereby the layer thicknesses of this partial area are evaluated. In order to comprehensively assess the large-area surface to be measured, individual selected partial areas or else all partial areas corresponding to the area of the entire surface to be measured can be consulted. Changes in layer thickness within the partial areas can also be evaluated owing to the measurement points arranged in a matrix. Furthermore, it is possible to draw a conclusion regarding the measured layer thicknesses compared to the predetermined minimum layer thicknesses, even as early as evaluation of a first partial area.

In accordance with a preferred embodiment of the method, the device for carrying out the measurement, which comprises at least one rotating body comprising at least one running face and receives the at least one measuring probe, is placed on the surface to be measured and rolled along a row in such a way that the at least one measuring probe is contacted against the surface to be measured at the lowest point of a cycloid path. A continuous measurement can therefore be taken, thus enabling a shorter measurement time. Furthermore, as a result of the arrangement of the measuring probe on a rotating body, the same contact conditions and thus measurement conditions for measuring the thickness of thin layers can be ensured at each measurement point. Once the measured values have been obtained at all measurement points of the partial area, the device is actively transferred to the next partial area in order to measure this matrix of measurement points. Such a measuring method is carried out, for example, with large surfaces to be measured of objects or devices which would be extremely arduous to handle themselves.

In a preferred embodiment of the method a stop device, in particular a stop washer or a connection ring, with a diameter greater than the rotating body is attached to the rotating body and the device with stop device is guided along an edge of the surface to be measured. It is thus possible for the rotating probe, in a defined manner, to be placed on and guided along an edge of the surface to be measured in an immediate edge region in order to take the measurement. As a result of this arrangement it is possible to create a defined gap between the edge and the successive measurement points along the edge. In particular in the case of ships and double-walled ships, which are particularly at risk of corrosion, it is very important to measure the thickness of thin layers at a predetermined distance from the edge. For example, this may be made possible by such a stop washer or a connection ring or by a spacer ring which is positioned thereon and is replaceable in particular. Alternatively, instead of guiding along the device with the rotating body, on which a stop washer or a stop ring is arranged, this rotating body is positioned so as to be fixed in place relative to a band-like material which is moved with a discontinuous or continuous path speed. In an alternative embodiment of the method the device for measuring the thickness of thin layers and comprising at least one measuring probe is placed on a rotating surface to be measured or on a band-like surface to be measured at the predetermined time intervals. As a result of the measurement taken in accordance with the method, measured values are also obtained at equidistant measurement points. In contrast to the aforementioned embodiment in which the equidistant measurement points are determined by a geometric variable, such as by the circumference of the running wheel, in this embodiment the distance between the measurement points is presently determined by timed cycles.

In a further preferred configuration of the method the mean value $\bar{x}$ and the standard deviation s are determined from the measured values of each partial area, and from this a coefficient of variation $V=100\times s/\bar{x}$ % is ascertained which is compared as a comparative value with an evaluation chart for assessing the quality of the coating. For assessing the quality of the coating a coefficient of variation is determined in accordance with the safety requirements and thus the minimum layer thickness present. This percentage of the coefficient of variation is sub-divided into different groups in the assessment chart, for example "excellent", "good", "adequate" and "often inadequate" and in each case a corresponding value of the coefficient of variation is allocated. Owing to the ascertainment of the coefficient of variation for each partial area, the numerical value obtained is compared to the predetermined numerical value and a conclusion is promptly drawn regarding the coating, more specifically to the effect that the coating quality only corresponds to the requirements in part, does not correspond to them at all or, for example, corresponds to them completely.

The problem addressed by the invention is further solved by a device in which a rotating body with a running face comprises at least one measuring probe, wherein a contact spherical cap of the measuring probe protrudes radially outwardly, at least slightly, from the running face and is arranged so as to be co-rotating on the rotating body, in such a way that the measuring probe is guided along a cycloid path over the surface to be measured. As a result of this device a rotating probe can be provided which is contacted against the surface to be measured at regular intervals as a function of the diameter of the rotating body. The measuring probe moves along a cycloid path. The running face, which is guided along over the surface to be measured, of the rotating body merely ensures that the measuring probe is applied at equidistant measurement points and a measured value is obtained. The rotating body itself is not involved in the measurement. The rotating body instead serves to ensure merely equidistant measurement points which are subsequently combined in an evaluation means to form a matrix.

In an advantageous configuration of the device at least two or more rotating bodies are provided which are rotatably mounted and guided on a common axle, and only one rotating body comprises at least one measuring probe. This arrangement of two or more rotating bodies along a common axle affords the advantage that security against tilting relative to the surface to be measured is thus provided and it is possible to position the measuring probe perpendicular to the surface to be measured at the measurement point.

In a further preferred embodiment of the device two or more rotating bodies, which each receive at least one measuring probe, are connected by a rigid axle and the measuring probes are orientated in the same angular position. This device affords the advantage that, for example, with two rotating bodies arranged adjacent to one another and with one measuring probe in each case, measured values of two measurement points arranged in adjacent rows can be obtained simultaneously. A further saving in terms of time can thus be made when obtaining the measured values along the measurement points within a partial area. Three or more rotating bodies, each with at least one measuring probe can also be provided in order to carry out a multiple measurement so to speak. This arrangement also affords the advantage that the time intervals for the individual measurement points are spaced apart in a defined manner. Furthermore, the device can preferably comprise rotating bodies in accordance with the number of rows of a partial area, in such a way that measured values are obtained at each measurement point of the partial area by moving only once along the row. So that the individual measurement points all lie in the same column, the rotating bodies are rigidly interconnected and the angular position of the measuring probe is orientated identically in the rotating bodies arranged adjacent to one another.

In a further preferred configuration of the device the measuring probe is mounted resiliently and flexibly so as to be sunk in the rotating body relative to the running face. The same force of application of the measuring probe against the surface to be measured is thus ensured at each measurement point so as to thus provide consistent measurement conditions at each measurement point. The sensor element is preferably retained by a spring assembly formed of two parallel and mutually spaced spring elements, in particular leaf springs. There is thus a displacement or sinking movement guided in the direction of the length of the shaft of the sensor element when the contact spherical cap is contacted against the surface to be measured. The measuring probe can thus be arranged perpendicular to the surface to be measured at the point of contact. As an alternative to the accommodation of two parallel spring elements, in particular leaf springs, a diaphragm-like spring assembly of the sensor element can also be provided on the contact spherical cap. Such an embodiment is known, for example, from DE 10 2005 054 593 A1, which is incorporated herein in full scope by way of reference.

In a further preferred configuration of the device at least one storage means is provided in the rotating body for the measured values obtained. A measured value can thus be obtained locally without the need for a line connection for an evaluation unit. Furthermore, an interface connected to the storage means for reading out the measured values and/or a transmitting and receiving means for wireless data transfer to an evaluation means is preferably provided on the rotating body. For example this interface can be configured as a serial interface or as a USB interface. Furthermore, the transmitting and receiving means may enable data transfer via radio, Bluetooth or the like.

In a preferred configuration of the device a stop device, in particular a stop washer or a stop ring, can be arranged on one rotating body, the circumference of which stop device is greater than the diameter of the rotating body. It is thus possible for the rotating body to be selectively guided at a predetermined distance along an edge of an object to be measured so as to take a defined measurement of the thickness of thin layers at a predetermined distance from the edge.

It is further provided for a spacer ring to be replaceably arranged on the stop ring or on the stop device on a lateral peripheral face. This spacer ring makes it possible, depending on the specific application, to set a predetermined distance for the measurement of the layer thickness starting from the outer edge. The distance can thus still be changed, for example with a stop ring or stop washer arranged rigidly on the rotating body. If the spacer ring and the stop washer or the stop ring form a unit, the distance between the measurement and the edge of the coating can in turn be adjusted and defined as a function of the thickness of the stop ring or stop washer which can be arranged on the rotating body.

In an advantageous development of the device the at least one rotating body comprising the at least one measuring probe is provided on a measuring carriage which comprises at least one guide roller. Such a measuring carriage can in turn be used to avoid tilting, in particular if a three-point bearing is provided as a result of the rotating body/bodies and/or the guide rollers. Furthermore, the rotating body can be applied and guided along in a defined manner with the assistance of the guide roller. An undercarriage is preferably provided between the rotating body/bodies and the guide roller, on which undercarriage a holding magnet for example can be arranged. As a result of such an arrangement it is still possible, in the case of partial areas to be inspected which are steep, to measure the surface to be measured since the measuring carriage is held against the surface to be measured by the holding magnets.

In a further preferred configuration of the device a cleaning device is associated with the running face of the rotating body, which face protrudes from the at least one measuring probe, said cleaning device cleaning at least the contact spherical cap of the measuring probe. The contact spherical cap is thus cleaned with each revolution of the rotating body, in such a way that a large number of partial areas can be checked in succession and consistent conditions for obtaining the measured values are provided. For example, the cleaning device is formed by bristles or rotating bristles so as to remove any dirt sticking to the contact spherical cap.

The invention as well as further advantageous embodiments and developments thereof will be described and explained hereinafter in greater detail with reference to the examples illustrated in the drawings. The features to be inferred from the description and the drawings may be applied, in accordance with the invention, either individually or in any combination. In the drawings:

FIG. 4 is a schematic side view of an alternative embodiment of the measuring device compared to FIG. 3a;

Figure 1:
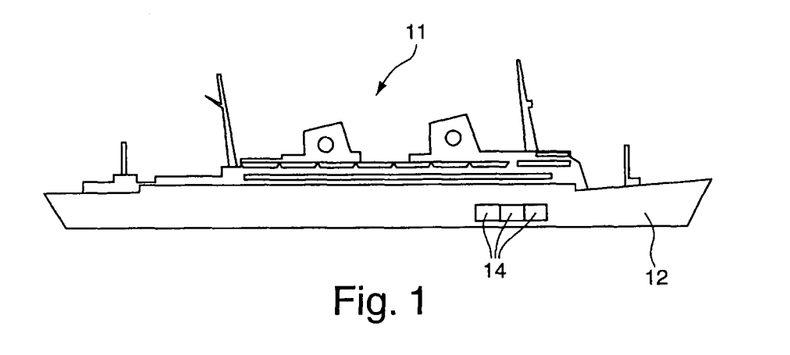
FIG. 1 is a schematic side view of a ship with a coated hull, the coating of which is subdivided as a surface to be measured into partial areas.

FIG. 1 shows a schematic view of a ship 11. A coating on the hull of a ship forms, for example, a large-area surface to be measured 12. Owing to increased safety requirements and in order to avoid corrosion, the quality of the coating on the hulls of ships is of great importance, particularly since damage to the ship can thus be prevented. Such coatings must therefore comprise a minimum value of layer thickness for a coating. It can only be ensured that such minimum values are observed if a mean value of the layer thickness is sufficiently greater than the minimum value. The necessary gap between the mean value and the minimum value of the layer thickness depends on the dispersion immanent to the coating process. The coefficient of variation V is expediently used as a measure for the dispersion. This is the ratio of the standard deviation s to the mean value x of the measured layer thickness values. From these coefficients of variation it is possible to draw a conclusion regarding the quality of the coating, and more specifically as to whether the minimum layer thickness is present completely, partly, or not at all to the required extent. The coefficient of variation ascertained can be compared with an assessment chart which is compiled on the basis of evaluated process results and is categorised into different statements. For example, the statement may be "excellent", "good", "adequate" or "often inadequate" and a maximum upper limit of the percentage value of the coefficients of variation is allocated to each of these statements. A quick statement regarding the quality of the coating can thus be made by comparing evaluated process results with the assessment chart based on the individual measured values obtained of the coefficients of variation calculated therefrom.

For rational assessment the surface to be measured 12 is to be subdivided, for large-area coatings, into individual partial areas 40 which are many times smaller than the surface to be measured 12. The surface to be measured is preferably subdivided into partial areas 40 of equal size.

Figure 2:
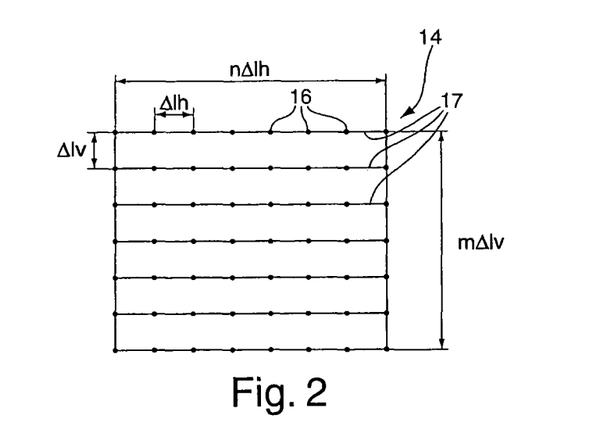
FIG. 2 shows a partial area with a matrix of measurement points.

Such a partial area 40 of the large-area surface to be measured 12 is shown enlarged in FIG. 2. This partial area 40 comprises a matrix of measurement points 16 which are provided at equidistant distances Δ·lh along a row 17. The rows 17 are in turn preferably arranged parallel to one another at equal distances Δ·lv, in such a way that a matrix of measurement points 16 or a network of measurement points 16 is distributed uniformly over the partial area 14. It is thus possible to come to an adequate conclusion regarding the layer thickness or progress of layer thickness for this partial area 14 without the need to measure the layer thickness over the entire surface.

Figure 3A:
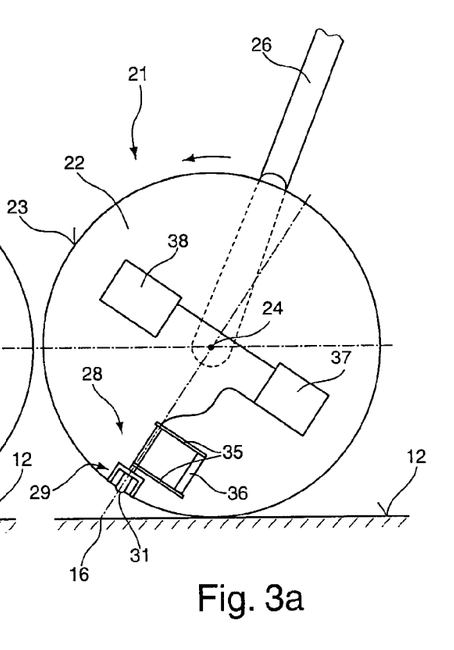
FIGS. 3a to c are schematic side views of a device for obtaining measured values at the measurement points of the partial area.
Figure 3B:
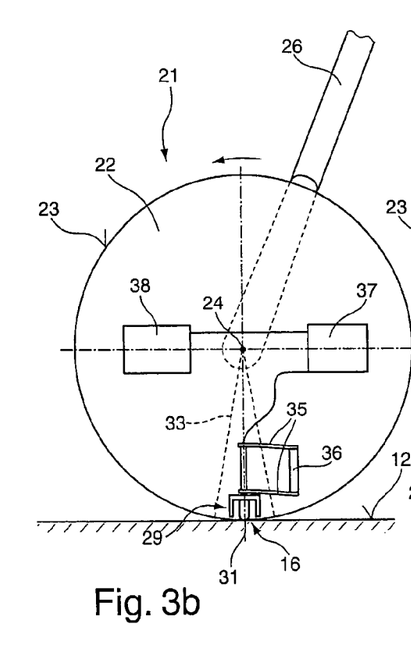
Figure 3C:
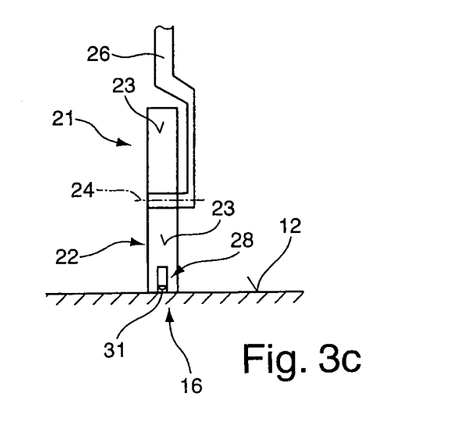

In accordance with the invention, in order to obtain measured values at the equidistant measurement points 16, a device 21 or a measuring device according to FIGS. 3a to c is provided which comprises a rotating body 22 with a running face 23. This rotating body 22 is mounted rotatably, for example, about a pivot pin 24 to a rod or a bar 26, in such a way that the user can place the running face 23 of the rotating body 22 on the surface to be measured 12 via the bar 26 and guide it along said surface to be measured. The rotating body 22 may be arranged so as to rotate relative to the bar 26 owing to a pivot pin mounted on one side or on either side. The rotating body 22 is preferably configured as a running wheel and receives a measuring probe 28, allocated to the running face 23, in the rotating body 22. The measuring probe 28 can also be configured externally on the rotating body 23. The rotating body 22 is preferably disc-shaped. The running face 23 may comprise a plastics material coating, rubber coating or the like. The surface of the running face 23 can also be selected as a function of the coating to be inspected in order to avoid damage.

The rotating body 22 may, for example, be formed as a running roller or running wheel. The rotating body 22 can also be formed, at least in part, as a hollow body. Such a rotating body 22 can be formed in one piece which comprises individual accommodating spaces, for example for the measuring probe and/or control components such as IC modules, function modules or the like, which spaces can be closed by a cover. For example a double-shelled rotating body with accommodating spaces contained therein can also be formed.

The measuring probe 28 comprises a sensor element 29 and a contact spherical cap 31 arranged on the longitudinal shaft thereof, the measuring probe 28 being positioned on the rotating body 22 in such a way that the contact spherical cap 31 protrudes outwardly, at least slightly, from the running face 23 in a starting position. This is shown for example in FIG. 3b. The sensor element 29 may be formed, for example, as a cup core which receives coil formers. DE 10 2005 054 593 A1 is referred to in full scope with regard to the configuration of the sensor element and the embodiment as a magnetic induction measuring probe or eddy current measuring probe. Alternatively, a plurality of sensor elements 29 of identical or different construction may also form a measuring probe 28 for identical or different measuring methods.

The measuring probe 28 is mounted resiliently and flexibly relative to the rotating body 28, i.e. the sensor element 29 is sunk and can be guided outwards again during a movement of application within an angular range 33. The contact spherical cap 31 rolls over the surface to be measured 27. This resilient and flexible arrangement of the sensor element 29 affords the advantage that a defined maximum measuring force is applied and the sensor element 29 can be reliably applied against the surface to be measured at each measurement point 16.

In accordance with a first embodiment the measuring probe 28 is received by two mutually parallel spring elements 35, in particular leaf spring elements, which make it possible to move the sensor element 29 parallel to the bearing 36. The sensor element 29 is orientated perpendicular to the surface to be measured 23 at the measurement point 16.

Alternatively it may be provided for a measuring probe according to DE 10 2005 054 593 A1 to be used, i.e. for the sensor element 29 with the contact spherical cap 31 to be received by a diaphragm-like spring element. This arrangement further affords the advantage that a water-tight arrangement can be created, which means that the sensor element 29 is both mounted in a resilient and flexible manner, and that a water-tight arrangement relative to the edge of the housing of the measuring probe 28 or relative to the accommodating space of the rotating body 22, in which the measuring probe 28 is arranged, is made possible via the diaphragm-like spring element. A measurement can thus also be taken underwater.

The measuring probes and spring bearing illustrated in FIGS. 3a and b are also arranged in an accommodating space in the rotating body.

In the device 21 at least one storage medium, in particular an IC chip, is preferably provided which stores the measured values of the individual measurement points 16. A transmitting and receiving means 38 may also be integrated in the rotating body 22, as a result of which the measured values obtained are transferred wirelessly to an evaluation means (not shown in greater detail). A data interface or a plurality of data interfaces can also be provided on an outer face of the rotating body 22.

In the embodiment according to FIGS. 3a to c, the rotating body 21 receives only one measuring probe 28. The sensor element 19 is guided along a cycloid path when the rotating body 22 is rolled along the surface to be measured 12, whereby the measuring probe 21 is contacted against the equidistant measurement points 16 in order to obtain a measured value. FIG. 3a shows a position of the rotating body 21 with the measuring probe 28 shortly before contact between the measuring probe 28 and the surface to be measured 12. FIG. 3b shows a contact point of the measuring probe 28 against the surface to be measured 12 at the measurement point 16 once the rotating body 21 has been rolled further along the surface to be measured 12. Shortly before the measurement point 16 is reached, the contact spherical cap 31 contacts the surface to be measured 12 and the measuring probe 28 is again removed fully from the surface to be measured shortly after the measurement point 16. In this case the sensor element 29 is not displaced along the surface to be measured 12. The angular range 33 for application of the contact spherical cap 31 to the surface to be measured 12 is determined in accordance with the circumference of the rotating body 22 and/or the extent by which the contact spherical cap 31 protrudes from the running face 23 of the rotating body 22.

Furthermore, two or more measuring probes 28 can be arranged in one rotating body 22, distributed uniformly over the circumference. For example a rotating body 22 with a large diameter may thus comprise three measuring probes 28 and a rotating body 22 with a small diameter may thus only comprise one measuring probe 28, and in each case a measured valued can be obtained with both rotating bodies at the same equidistant measurement points 16 of the partial area 14.

When obtaining measured values the measured values are simultaneously allocated in succession along each row and each row is also allocated to the others within the partial area. When assessing the measured values an allocation can thus simultaneously be made to the respective measurement points within the matrix in such a way that, for example, a change in the layer thickness within the partial area can be recognised.

The device 21 shown in FIGS. 3a to c thus represents a rotating probe which enables simple handling. Such a rotating probe can not merely be guided by hand, but can also be held by machine or moved along a surface by a handling means.

Figure 4:
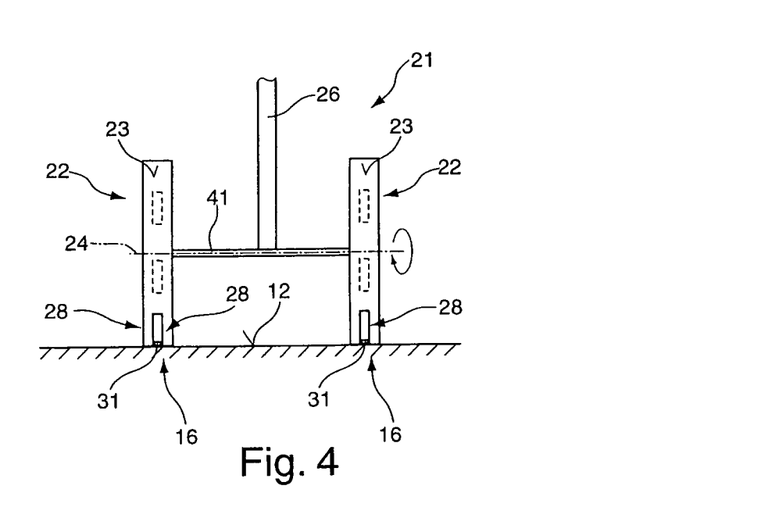

FIG. 4 shows an alternative embodiment to that in FIGS. 3a to c. This device 21 comprises, for example, two rotating bodies 22 which are interconnected by a common rigid axle 41. Each of these rotating bodies 22 comprises at least one measuring probe 28. These are orientated identically to one another in terms of their angular position. The distance between the rotating bodies 22 preferably corresponds to the distance $\Delta \cdot lv$ between two rows 17 of the partial area 14. This arrangement affords the advantage that the rotating body 22 is arranged in a tilt-free manner relative to the surface to be measured 12 as a result of a two-point support.

Alternatively, only one of the two rotating bodies 22 may accommodate the at least one measuring probe 28 and the second rotating body 22 may merely orientate and guide, in a facilitated manner, the rotating body 22 comprising the measuring probe 28 relative to the surface to be measured 12.

Figure 5:
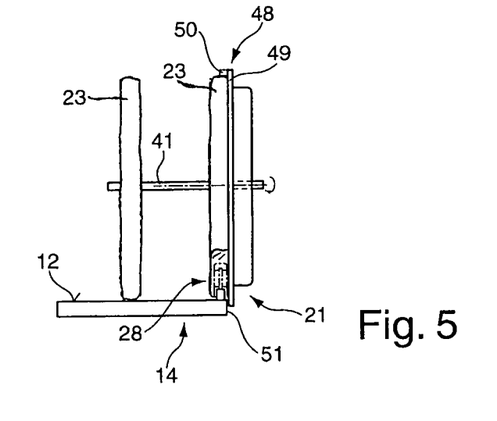
FIG. 5 is a schematic view of an alternative embodiment of the device according to FIGS. 3a to c.

FIG. 5 shows a schematic view of a device 21, for example as emerges from FIG. 4. The present device 21 differs in that a stop device 48 in the form of a stop washer 49 or a stop ring can be attached to the rotating body 22 or integrally moulded or arranged thereon in one piece, whereby it is thus possible for the device 21 to be guided along an edge 51 of the surface to be measured 12 via this stop device 48. The stop washer 49 or the stop ring is preferably provided on the rotating body 22 so as to be replaceable and comprises an outer circumference which is greater than that of the rotating body 22. The stop washer 49 preferably comprises a spacer ring 50 on the lateral peripheral wall, as a result of which spacer ring the distance between the measuring probe 28 in the rotating device and the edge 51 to be inspected can be precisely adjusted. This means that the measuring probe 28 can be adjusted via such spacer rings 50, which have different thicknesses and widths, in terms of the distance from the edge of the surface to be measured.

Figure 6:
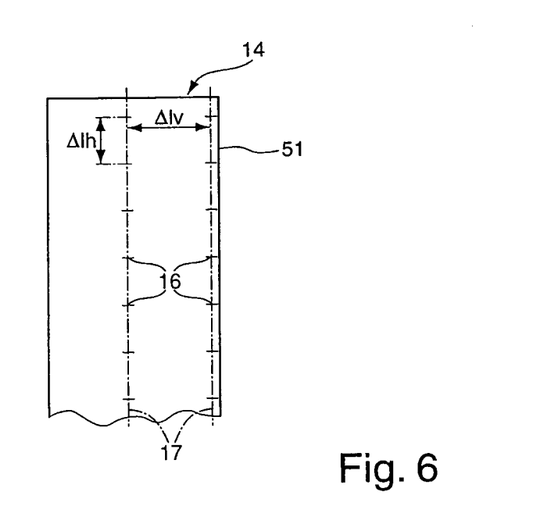
FIG. 6 shows a partial area with a matrix of measurement points.

For example, a matrix of measurement points 16 arranged in succession over the distance $\Delta$ lh can be seen from FIG. 6, which matrix can be detected by such a device 21 with a distance of $\Delta$ lv between the rotating devices 22. The distance between the measurement points 16, which are directly associated with the edge of the surface to be measured, can be adjusted via the spacer rings 50 in such a way that, for example, a distance of 0.2 to 2 mm can be observed.

The stop device 48 can also be arranged on a device in 11 comprising only one rotating body 22.

Figure 7A:
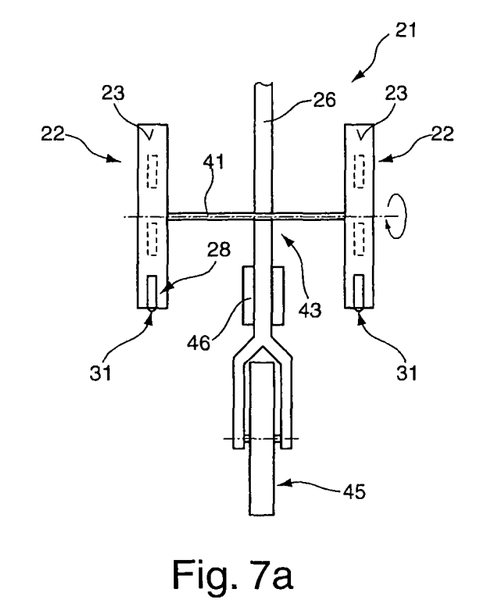
FIGS. 7a and b are schematic views of a further alternative embodiment of the measuring device compared to FIG. 3a, and FIG. 8 is a graph in which a shortfall amount is given as a function of the relationship $\bar{x}/T_{min}$ for the coefficients of variation of 15%, 20% and 25%.
Figure 7B:
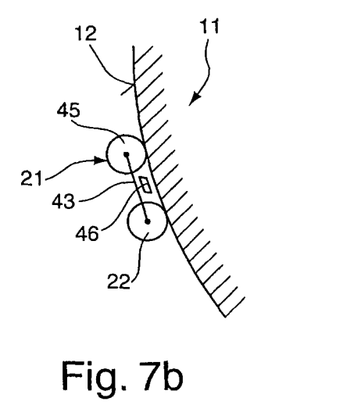

FIGS. 7a and b provide further schematic views of an alternative embodiment of the device 21. This device 21 is configured as a measuring carriage which receives the axle 41 on an undercarriage 43. A guide roller 45 is additionally provided on the undercarriage 43 and, together with the two further rotating bodies 22, forms a type of three-point bearing for the measuring carriage. The measuring carriage can in turn be guided along the partial area via a bar 26. Depending on the orientation of the surface to be measured 12, in particular with a steep arrangement such as the hull of a ship, one or more holding magnets 46 can be provided on the undercarriage 43, thus still ensuring reliable contact between the device 21 and the surface to be measured 12.

Alternatively, the measuring carriage according to FIGS. 7a and b may comprise a self-contained drive so that it moves independently along the rows 17 of the partial area 14.

Furthermore, the measuring carriage may preferably be operable via a radio control, in such a way that the movement of the device 21 can accordingly be controlled and manipulated.

In order to detect the quality of the coating, for example on the hulls of ships, the rotating probe 28 according to FIGS. 3a to c first passes through each row 17 of the partial area 14. The measured values obtained at the measurement points 16 are obtained and saved for this partial area 14. The mean value $\bar{x}$ of the layer thickness for the partial area 14 is ascertained from said measured values. In order to further assess the quality of the coating, it is necessary for the mean value $\bar{x}$ of the layer thickness to be sufficiently greater than the predetermined minimum value for the coating. The necessary gap between the mean value and the minimum value depends on the dispersion S immanent to the coating process. The coefficient of variation V is preferably used as a measure for the dispersion S. This is the ratio of the standard deviation s to the mean value $\bar{x}$ of the layer thickness values measured, i.e. $V=100 \times s/\bar{x}$ [in percent]. This coefficient of variation V can thus be regarded as the quality value or comparative value of the coating.

Difference percentage ranges of a coefficient of variation can be determined from an evaluated process result for the respective area of application and assessment. For example, a range up to 1% may be classified as excellent, a range up to 5% as good, a range up to 10% as adequate and a coefficient of variation of 15% as inadequate. These ranges can be graded by colour. Once the corresponding coefficient of variation has been ascertained for the respective partial area 14, it is possible to determine, by comparing the ranges, whether the partial area 14 exhibits good, adequate, or inadequate coating.

Figure 8:
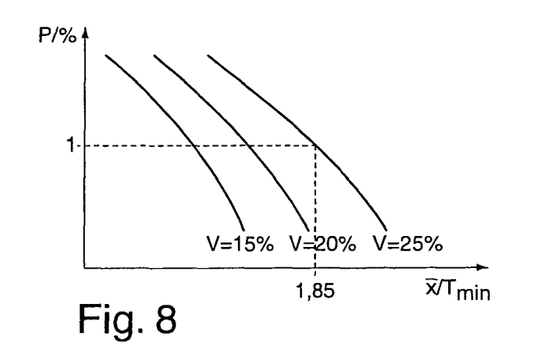

Based on this, monitoring and evaluation procedures can be carried out for example when applying coatings to the hulls of ships. Substantial savings when applying coating material can always be achieved if the dispersion and thus the coefficient of variation is reduced, since the default for the mean value can also thus accordingly be lowered. However, if such a gap between the mean value and the minimum value determined is too small, the shortfall amount to be expected is necessarily accordingly greater, i.e. the subsequent improvements required are accordingly more expensive. Based on these considerations, an assessment of the accompanying chart according to FIG. 8 can be made based on a predetermined risk in percent. In this chart the ratio between the mean value x and the minimum layer thickness $T_{min}$ is plotted along the X axis. The risk in percent with a margin of error is plotted along the Y axis. At the same time, a shortfall amount in the minimum layer thickness is given in accordance with the coefficients of variation of, for example, V=15%, V=20% and V=25% as a function of the ratio of the mean value to the minimum layer thickness. For example, if a risk of 1% is selected with a coefficient of variation of 25%, a ratio of approximately 1.85 is to be observed, i.e. 1.8 times the gap between the mean value and the value of the minimum layer thickness is to be observed in order to achieve a sufficient coating with a risk of 1% margin of error. A quality assessment can thus be carried out directly after a coating procedure, in such a way that the further application thicknesses which are currently in the process of being applied in the case of the hull of a ship can be varied at this point. The layer thickness of the further coating still to be applied can also be determined in such a way that, if the layer thickness ascertained is insufficient, it is still possible to compensate for this. It is thus possible to reduce production and also to safeguard the coating process.

The invention claimed is:

1. Method for measuring the thickness of thin layers over large-area surfaces to be measured, in which at least one measuring probe, which comprises at least one sensor element and at least one contact spherical cap associated with the sensor element, is applied to the surface to be measured in order to obtain a measured value, wherein
the large-area surface to be measured is subdivided into individual partial areas,
a matrix of measurement points is determined for each partial area to be inspected,
measured values are ascertained at equidistant measurement points along at least one row of the matrix of the partial area using a device carrying the at least one measuring probe, and
measured values are ascertained successively for all rows of the matrix in the partial area and evaluated for this partial area.

2. Method according to claim 1, wherein the device, which comprises at least one rotating body comprising at least one running face and receives the at least one measuring probe, is placed on the surface to be measured and rolled along a row, and the measuring probe is guided over the surface to be measured along a cycloid path and is contacted against the individual measurement points.

3. Method according to claim 1, wherein a stop device, with a diameter greater than that of the rotating body, is attached to the rotating body, and in that the device comprising the stop device is guided along an edge of the surface to be measured.

4. Method according to claim 1, wherein the device comprising the at least one measuring probe is placed, at predetermined regular time intervals, on a rotating surface to be measured or on a surface to be measured which is guided in a band-like manner.

5. Method according to claim 1, wherein the mean value $\bar{x}$ and the standard deviation s are determined from the measured values of each partial area, and from this a coefficient of variation $V=100 \times s/\bar{x}$ % is ascertained which is compared as a comparative value with an evaluation chart for assessing the quality of the coating.

6. Device for measuring the thickness of thin layers over large-area surfaces to be measured, in particular for carrying out the method according to claim 1, comprising at least one measuring probe, which comprises at least one sensor element and at least one contact spherical cap associated with the sensor element, wherein the at least one measuring probe is arranged on a rotating body comprising a running face, the contact spherical cap of the measuring probe protruding raidally outwardly, at least slightly, from the running face and being arranged so as to be co-rotating on the rotating body, in such a way that the measuring probe is guided along a cycloid path relative to the surface to be measured.

7. Device according to claim 6, wherein two or more rotating bodies are provided which are rotatably mounted and guided on a common axle and only one rotating body receives the at least one measuring probe.

8. Device according to claim 6, wherein two or more rotating bodies, which each receive at least one measuring probe, are connected to a rigid axle and the measuring probes are orientated in the same angular position.

9. Device according to claim 6, wherein the measuring probe is mounted resiliently and flexibly so as to be sunk in the rotating body relative to the running face.

10. Device according to claim 9, wherein the measuring probe comprises a spring assembly of two parallel and mutually spaced flat spring elements or a diaphragm-like spring assembly.

11. Device according to claim 6, wherein at least one storage means is provided in the rotating body for the measured values of the at least one measuring probe, and an interface is provided in the rotating body for reading out the measured values and/or a transmitting and receiving means is provided in the rotating body for wireless data transfer to an evaluation means.

12. Device according to claim 6, wherein a stop device is arranged on one rotating body and the outer diameter of the stop device is greater than that of the rotating body.

13. Device according to claim 12, wherein a spacer ring is replaceably arranged on the stop device on a lateral peripheral face.

14. Device according to claim 6, wherein the at least one rotating body comprising the at least one measuring probe is provided on a measuring carriage which comprises the at least one guide roller.

15. Device according to claim 14, wherein the measuring carriage comprises an undercarriage in which a holding magnet in particular is arranged.

16. Device according to claim 6, wherein a cleaning device is associated with the running face of the rotating body, which face protrudes from the at least one measuring probe, said cleaning device cleaning at least the contact spherical cap of the measuring probe.

* * * * *